Patented Aug. 14, 1934

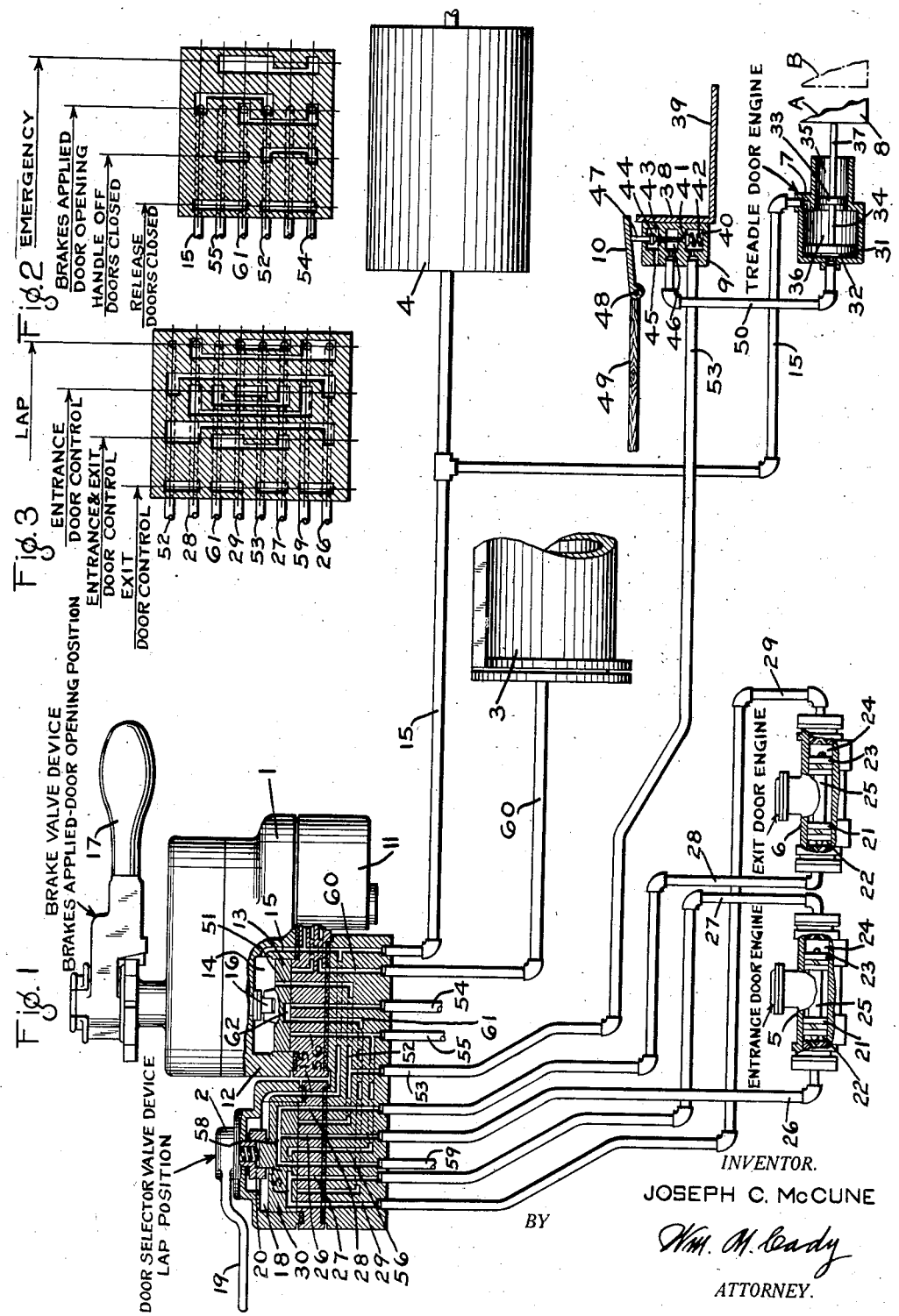

1,969,813

UNITED STATES PATENT OFFICE 1,969,813

DOOR CONTROL DEVICE

Joseph C. McCune, Edgewood, Pa., assignor to The Westinghouse Air Brake Company, Wilmerding, Pa., a corporation of Pennsylvania Application May 29, 1931, Serial No. 540,861

2 Claims. (Cl. 303—6.1)

This invention relates to fluid pressure brakes and more particularly to a safety control brake equipment having a brake valve device for controlling the brakes and the doors of a car.

Particularly on cars in electric traction service a plurality of car doors are provided, such as an exit door, an entrance door, and a treadle operated door which under certain conditions is adapted to be opened by a passenger in the car, and the principal object of my invention is to provide a safety car control equipment having improved means for controlling the operation of a treadle door.

In the accompanying drawing; Fig. 1 is a diagrammatic view, mainly in section, of a safety car control equipment embodying my invention; Fig. 2 is a diagrammatic development view, showing the connections established in various positions of the rotary valve of the brake valve device shown in Fig. 1; and Fig. 3 is a diagrammatic development view, showing the connections established in various positions of the rotary valve of the door selector valve device shown in Fig. 1.

As shown in the drawing, the safety car control equipment comprises a brake valve device 1, having preferably associated therewith a door selector valve device 2, a brake cylinder 3, a fluid pressure reservoir 4, an entrance door engine 5, an exit door engine 6, a treadle door engine 7, a car door 8 operative by the treadle door engine 7, a treadle door engine control valve device 9 and means, preferably in the form of a foot operated treadle 10 for operating the valve device 9.

The brake valve device 1 may be of any type having a door opening position in which fluid under pressure is supplied for opening the doors of a car. For the purpose of illustration, however, the brake valve device 1 is similar to that disclosed in my pending application, Serial No. 463,387, filed June 24, 1930, and only that portion of the brake valve device is shown in section which is pertinent to my invention. The brake valve device comprises a portion 11 for effecting a service application and a release of the brakes, and a portion 12 operative simultaneously with the portion 11 for controlling the car doors and for effecting an emergency application of the brakes as is fully described in the above mentioned pending application.

The portion 12 of the brake valve device 1 comprises a rotary valve 13 contained in a chamber 14 communicating through passage and pipe 15 with the reservoir 4, the rotary valve 13 being adapted to be turned by a handle 17 through the medium of a stem 16.

The door selector valve device comprises a rotary valve 30 contained in a chamber 18 and adapted to be turned to various door controlling positions by means of a handle 19 which is operatively connected to said rotary valve by means of a driving shaft 20.

The entrance door engine is of the well known type comprising a piston 21 having at one side a chamber 22, a piston 23 having at one side a chamber 24, and a stem 25 carried by and movable with said pistons for opening and closing the car entrance door (not shown). The piston chamber 22 is connected to a door opening pipe 26 leading to the seat of the selector valve rotary valve 30, and the piston chamber 24 is connected to a door closing pipe 27 leading to the seat of said rotary valve.

The exit door engine 6 may be of the same construction as the entrance door engine 5 and has the piston chamber 22 connected to a door opening pipe 28 leading to the seat of the rotary valve 30 and the piston chamber 24 connected to a door closing pipe 29 leading to the seat of said rotary valve.

The treadle controlled door engine 7 may be of any type, but as shown in the drawing is of the differential type and comprises a piston 31 having at one side a chamber 32, a piston 33 of smaller area than piston 31 and connected thereto by means of a rod 34. The piston 33 has at one side a chamber 35 open to the atmosphere, and intermediate the pistons 32 and 33 is a chamber 36. Projecting from the piston 33 is a push rod 37 adapted to move the car door 8.

The treadle door engine control valve device 9 comprises a casing which may be secured to the riser 38 of a car door step 39. Said casing has a chamber 40 containing a door opening valve 41 and a spring 42 for urging said valve to its seat, and another chamber 43 containing a door closing valve 44, the chamber 43 being open to the atmosphere through a passage 45. The valves 41 and 44 are provided with fluted stems which engage in a chamber 46, such that the seating of valve 41 by spring 42 unseats the valve 44. The valve 44 is provided with an upwardly extending operating stem 47 which projects through the casing and which, when moved in a downwardly direction, seats valve 44 and unseats valve 41.

The valves 41 and 44 may be arranged for operation by a passenger in various ways, one of which, as shown in the drawing, is by means of a treadle 10 hinged at one edge 48 to the car floor 49, so that downward movement of the treadle 10, due to a passenger stepping thereon, acts through the stem 47 to seat valve 44 and unseat valve 41.

In operation, the treadle 10 is normally relieved of pressure by a passenger and is in the position shown in the drawing, in which position chamber 32 of the treadle door engine is open to the atmosphere through pipe 50, valve chamber 46 of the treadle door control valve device 9, past the door closing valve 44 and through the atmospheric passage 45.

Fluid under pressure is supplied to the reservoir 4 in the usual manner and flows therefrom through pipe 15 to chamber 36 intermediate the door engine pistons 31 and 33. Due to the outer face of the pistons 31 and 33 being subject to atmospheric pressure when the treadle 10 is in its normal position, the pressure in chamber 36 acting on the differential areas of pistons 31 and 33 moves said pistons to the position shown in the drawing in which the car door 8 is in the door closed position A.

The brake valve device 1 is provided with a plurality of different brake controlling positions such as release position, brakes applied position and emergency position, and in the brakes applied position, in which fluid under pressure is supplied through passage and pipe 60 to the brake cylinder 3 to effect an application of the brakes, fluid supplied from the reservoir 4 through pipe and passage 15 to the rotary valve chamber 14, flows through a port 51 in the rotary valve 13 to a door opening passage 52 in the same manner as fully described in my pending application hereinbefore mentioned.

With the brake valve device in the brakes applied door opening position, the fluid supplied to passage 52 flows through pipe 53 to valve chamber 40 of the treadle door engine control valve device 9. Now, if a passenger desires to get out of the car, he steps on the treadle 10 and the resulting downward movement seats valve 44 to close the atmospheric connection to the door engine chamber 32. The seating of valve 44 unseats valve 41 and permits fluid under pressure supplied from the brake valve device to flow from chamber 40 to chamber 46 and thence through pipe 50 to piston chamber 32. This balances the opposing fluid pressures acting on the piston 31, so that reservoir pressure in chamber 36 acting on the small piston 33 moves said pistons toward the right hand and this movement transmitted through push rod 37 moves the door 8 from the door closed position A to the door open position B.

When the door 8 is in door open position, the passenger may get out of the car and if there are several passengers, their walking over the treadle 10 holds it in the depressed position in which the car door 8 is maintained open for their exit. However, upon removal of the passenger's pressure or weight from the treadle 10, spring 42 seats the door opening valve 41, unseats the door closing valve 44 and raises the treadle 10. The unseating of valve 44 permits fluid under pressure to be vented from the door engine piston chamber 32 to the atmosphere and the pressure of fluid in chamber 36 acting on the differential areas of pistons 31 and 33 then moves the door engine pistons 31 and 33 to their normal door closed position, and the car door 8 from the open position B to the closed position A.

It will be evident that in order for a passenger to open the car door 8 by depressing treadle 10, the brake valve device must be in the brakes applied door opening position so as to supply fluid under pressure to the pipe 53, and the car door 8 can be maintained open by the passing of one or several passengers over the treadle 10 in getting off of the car as long as the supply of fluid to pipe 53 is maintained, but as soon as the brake valve device is moved to any other position, the pipe 53 is opened to the atmosphere through the exhaust passage and pipe 54 and when thus connected to the atmosphere, the depressing of treadle 10 is ineffective.

Fluid under pressure supplied to the door opening passage 52 when the brake valve device is moved to brakes applied door opening position flows to the seat of the selector valve rotary valve 30.

The selector valve device 2 is similar to that disclosed in Patent 1,451,441 of Clyde C. Farmer, dated April 10, 1923, but according to the invention, a lap position has been provided as shown in Fig. 1, in which position the door opening passage 52 is lapped by the rotary valve 30, so that if the operator so desires, neither the entrance door 5 or exit door 6 will be opened by fluid supplied to passage 52 for permitting operation of the treadle door 8.

When the selector valve device 2 is in lap position, fluid under pressure is supplied from the usual emergency pipe 55, through passage 56, cavity 57 in the selector valve rotary valve 30 and door closing pipe 27 to the entrance door engine piston chamber 24 and also from cavity 57 through door closing pipe 29 to the exit door engine piston chamber 24, thereby holding the entrance door engine and exit door engines in the door closed positions, since the respective door opening pipes 26 and 28 are both open to the atmosphere through cavity 58 in the selector valve rotary valve 30 and the atmospheric passage and pipe 59.

If, when fluid under pressure is supplied to the door opening passage 52, the operator desires to operate the entrance door engine, he turns the rotary valve 30 to entrance door control position in which the connections to the exit door engine are maintained as in lap position, but the entrance door engine is operated by fluid under pressure supplied from passage 52 through passage and pipe 26 to piston chamber 22 upon the venting of fluid under pressure from piston chamber 24, through pipe and passage 27, passage 61, cavity 62 in the brake valve rotary valve 13 and exhaust passage and pipe 54.

If the operator desires only to operate the exit door engine, he turns the door selector valve to exit door control position, in which the entrance door engine is maintained in closed position as when the selector valve is in lap position, but the exit door engine is operated by fluid under pressure supplied from passage 52 through passage and pipe 28 to piston chamber 22 upon the venting of fluid under pressure from piston chamber 24 through pipe and passage 29, passage 61, cavity 62 in the brake valve rotary valve 13 and exhaust passage and pipe 54.

If desired, the selector valve device may be turned to entrance and exit door control position, in which both door engines are operated by supplying fluid under pressure from passage 52 through the exit door engine opening pipe 28 to piston chamber 22 and also through the entrance door engine opening pipe 26 to piston chamber 22 and at the same time venting fluid under pressure from the respective piston chambers 24 through pipes 29 and 27, passage 61, cavity 62 in the brake valve rotary valve 13 and the atmospheric passage and pipe 54.

It will be noted that as with the treadle door engine 7, the operation of the entrance door engine 5 and exit door engine 6 can only be effected when fluid under pressure is supplied to passage 52 by the brake valve device in the brakes applied door opening position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a brake valve device having a passageway and movable to a door opening position for supplying fluid under pressure to said passageway and to another position for venting fluid under pressure from said passageway, a door engine operated by fluid under pressure supplied to said passageway for opening the door of a car and operative upon the venting of said passageway to close said door, another door engine operated by fluid under pressure for opening another door of the car, and valve means operated by a passenger for establishing communication from said passageway to the second mentioned door engine.

2. The combination with a brake valve device having a passageway and movable to a door opening position for supplying fluid under pressure to said passageway and to another position for venting fluid under pressure from said passageway, a door engine operated by fluid under pressure supplied to said passageway for opening the door of a car and operative upon the venting of said passageway to close said door, another door engine operated by fluid under pressure for opening another door of the car and operative upon the venting of fluid under pressure for closing the other door of the car, a treadle controlled by a passenger, and valve means operative by said treadle when subject to manual pressure for supplying fluid under pressure from said passageway to the second mentioned door engine and operative upon the relief of manual pressure on said treadle to vent fluid under pressure from the second mentioned door engine.

JOSEPH C. McCUNE.